Patented Dec. 18, 1945

2,391,128

UNITED STATES PATENT OFFICE 2,391,128

RECOVERY OF PHENOLIC MATERIALS

Stephen P. Cauley, Jackson Heights, and Vladimir L. Shipp, New York, N. Y., assignors to Socony-Vacuum Oil Company, Incorporated, New York, N. Y., a corporation of New York No Drawing. Application August 9, 1941, Serial No. 406,222

2 Claims. (Cl. 260—627)

This invention is directed toward the purification of raw phenolic materials, particularly those recovered from petroleum.

Certain crude oils and crude oil fractions, especially after processing by cracking, contain appreciable amounts of phenolic materials. The latter can be recovered by scrubbing the petroleum stocks with solutions of alkalies such as sodium hydroxide, potassium hydroxide, and the like. In a common refinery treating operation known as a pre-caustic wash, naphtha is thoroughly mixed with a caustic soda solution, and if the amount of caustic and time of contact are adequate, a complete extraction of phenolic bodies can be made. From scrubbing naphthas corresponding to the boiling range of motor gasoline, usually a mixture of cresols, and xylenols is obtained. From higher boiling fractions, correspondingly higher homologs of phenol derivatives are recovered.

It is known to those familiar with the art, that spent caustic from the aforementioned operation, contains not only phenolic materials but sodium mercaptides, sulphides and other sulphur containing compounds. Some of them, particularly the derivatives of mercaptans, impart a repulsive odor to the phenolic materials.

In the process of recovery of cresols and xylenols, known as commercial cresylic acid, the spent caustic has been usually neutralized with a mineral acid, say sulphuric acid. Both the raw cresylic acid and the gases evolving during the acidification are evil smelling. This constitutes a nuisance in and around the refinery and also greatly decreases the commercial value of the recovered cresylic acid.

This invention has for its object the provision of a method for the recovery of phenolic materials in a higher state of freedom from associated sulphur-containing compounds, to enable the production of commercial phenolic materials substantially free of the odor associated with such sulphur compounds.

The invention is based upon the use of a process wherein the acidification process is conducted in two successive steps.

The inventors have discovered that by the use of such fractional acidification, the odor nuisance from mercaptans, etc., liberated during processing can be eliminated, and the odor of the cresylic acid can be greatly improved. Additionally, the process is capable of making a more effective use of acid, and substantial savings may be made in the acid used in recovery of phenolic materials from waste lyes.

The process of fractional acidification is characterized by the fact that instead of adding sufficient acid to secure complete neutralization, a substantially lesser amount of acid is added, and the resulting mix is allowed to separate into an oily layer comprising substantially raw sodium phenolates and phenolic materials and an aqueous layer which is discarded. Apparently a very large amount of the alkali salts of hydrogen sulphide, of mercaptans, and of similar sulphur containing materials remain unbroken, in this aqueous layer which is discarded. When the separated oily layer is subsequently completely neutralized, there is practically no evolution of odorous gases, as is commonly observed near the termination of one-step neutralization of waste lyes, and the resulting recovered phenolic material is much lower in sulphur content and much improved in odor. In addition, the total consumption of acid is materially decreased.

For example, in the treatment of waste lyes derived from the caustic washing of cracked gasoline, the material being recovered is a commercial grade of cresylic acid. At the end of the first or partial neutralization, the oily layer consists substantially of cresylic acid and raw sodium cresylate. Upon final neutralization of this layer, little or no gas is evolved, the crescylic acid is of better odor, and the sulphur content of the acid is substantially lower than that of acid derived by one-step acidification from the same waste lye.

In practicing the fractional acidification, there is, for each lye, a minimum amount of acid which must be added, in the first step, before a substantial layer separation will take place. With some stocks this will be about 50 percent of the total acid required for complete one-step neutralization. With most stocks the amount here needed will range from 50 to 60 percent of the total acid required for one-step neutralization. In all fractional acidification, it is necessary to add at least that amount of acid, in the first step, which will separate enough phenolic material to permit layer separation.

Also, the addition of acid in amounts near to but somewhat above this critical amount, will give recovery of most of the recoverable phenolic material. More may be liberated in this first step by the addition of more acid, but more acid will then be needed for subsequent neutralization, decreasing the over-all saving of acid, and the process is thus subject to an economic balance in balancing increased phenolic recovery against increased mineral acid used. In any event, however, the real point of departure is in carrying the first acidification only so far as to recover a desirable amount of phenolic material while allowing unwanted sulphur containing materials to remain unbroken in and be drawn off with the aqueous layer of the first separation.

Comparative examples of old and new operation follow:

Waste caustic lye from naphtha scrubbing was neutralized with hydrochloric acid to methyl orange reaction, in other words to complete decomposition of sodium cresylate into free cresylic acid and sodium chloride. A duplicate sample of the same lye was reacted with 60% of the amount of hydrochloric acid necessary for complete one-step neutralization; then the aqueous layer was drained, and the mixture of raw sodium cresylate and free cresylic acid was acidified to completion. A third sample of the same lye was acidified with 90% of the full amount of acid, separated from aqueous layer and acidified to completion. The results are summarized in the following table.

| Treatment | Sulphur content of cresylic acid produced | Relative acid consumption |
|---|---|---|
| | Percent | Percent |
| Complete neutralization with HCl in one step | 0.80 | 100 |
| 2 stage neutralization with 60% of HCl in first step, draining the aqueous layer and finishing the neutralization of the supernatant layer | 0.62 | 76.7 |
| Same as above, but with 90% of HCl in the first step | 0.52 | 93.0 |

It will be observed from the above that very considerable decreases in the acid used for acidification, and in the sulphur content of the recovered phenolic material are experienced. The improvement in the odor of the recovered material is greater than indicated by comparison of the sulphur content. Not apparent in the table, but of major importance from the manufacturing standpoint is that complete avoidance of the copious evolution of hydrogen sulphide and mercaptans, usual in the older process, has been obtained. Those materials were discarded, without evolution, as alkali salts, with the first separated aqueous layer.

In this specification, and in the claims, the term phenolic material is used, with the intent thereby to cover hydroxyaromatic materials such as phenol, cresol, xylenol, and similar materials occurring in and derived from petroleum hydrocarbon. Where the term complete neutralization of the waste lye or its equivalent is utilized, in speaking of the amount of acid used, what is referred to is the complete one-step neutralization of the waste lye.

Where the term strong acid is used, it refers to the usual acids, such as sulphuric, sulphurous, hydrochloric, carbonic acid and their equivalents such as may be used to separate phenolic material from waste lyes, as is usual in the art, where any acid with a dissociation constant at 25° C. of more than $1 \times 10^{-8}$ is known to be so useful.

We claim:

1. In the recovery of phenolic materials from waste lyes derived from caustic treatment of petroleum hydrocarbons, the improvement comprising adding to the waste lye an amount of a strong acid substantially less than that required for complete neutralization but sufficient to bring about layer formation in the treated lye, separating the oily layer from the reaction mixture, acidifying the oily layer to substantial neutrality and discarding the aqueous layer formed by the second acidification.

2. In the recovery of phenolic materials from waste lyes derived from caustic treatment of petroleum hydrocarbons, the improvement comprising adding to the waste lye an amount of a strong acid equal to about 50 to 60% of that required for complete neutralization of said lye, permitting the acid treated lye to separate into two layers, separating the oily layer, acidifying the separated oily layer to substantial neutrality and discarding the aqueous layer formed as a result of the second acidification.

STEPHEN P. CAULEY.
VLADIMIR L. SHIPP.